Oct. 11, 1938.  J. L. HATCHER  2,132,418
CLUTCH MECHANISM
Filed Aug. 21, 1936
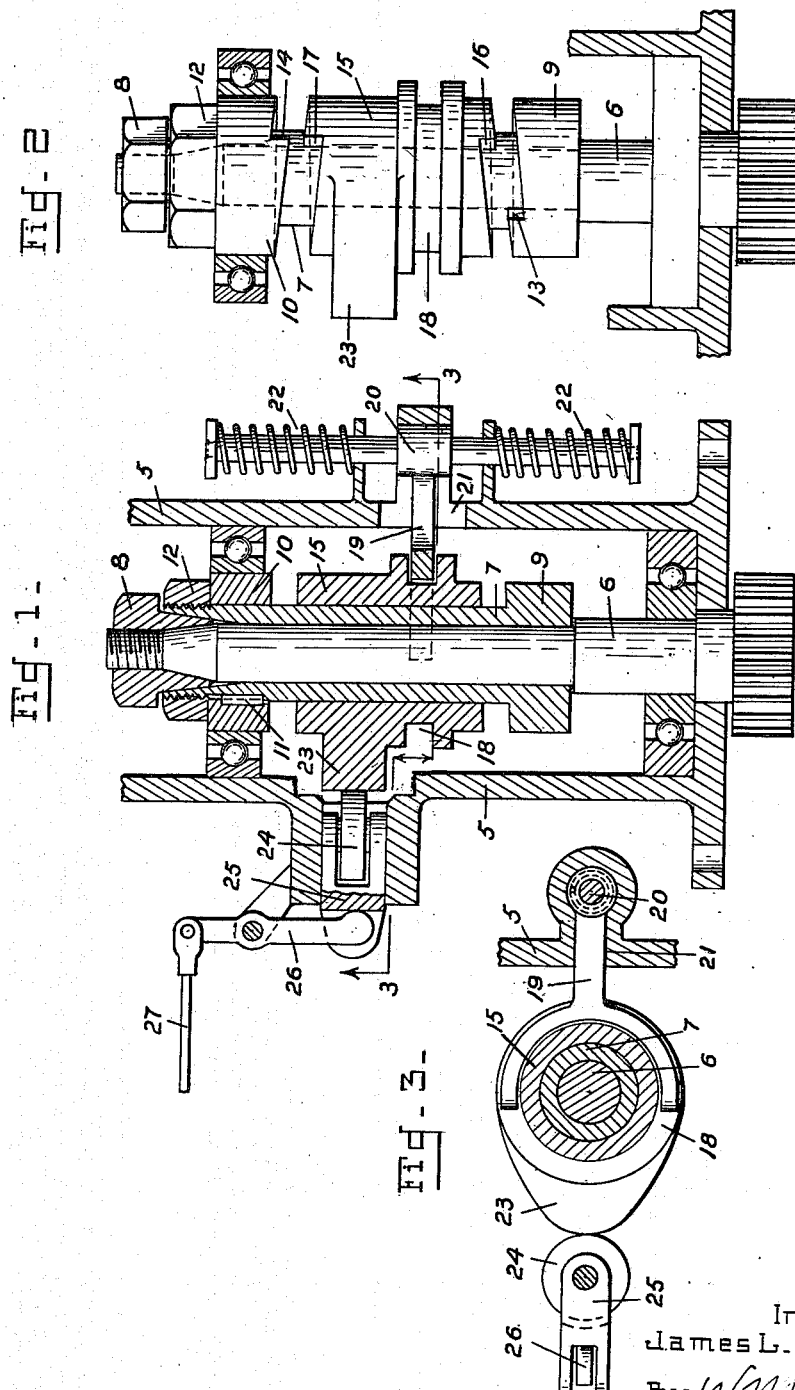
Inventor
James L. Hatcher
By W. N. Roach.
Attorney Patented Oct. 11, 1938

2,132,418

UNITED STATES PATENT OFFICE 2,132,418

CLUTCH MECHANISM

James L. Hatcher, United States Army, Winchester, Va.

Application August 21, 1936, Serial No. 97,134

3 Claims. (Cl. 192—30)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a synchronized control gear for machine guns.

In arranging a machine gun to fire between the propeller blades of aircraft it is customary to control the operation of a trigger motor on the gun by means of an impulse generator associated with the engine that drives the propeller.

The purpose of this invention is to provide a clutch in the impulse generator whereby the cam member may be retained in a neutral position or driven from different angularly displaced positions of the driving shaft to allow for different ranges of speed of the propeller blades. The invention has particular application in connection with three blade propellers.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a longitudinal sectional view of a synchronizing gear constructed in accordance with the invention.

Fig. 2 is a view in elevation of the clutch.

Fig. 3 is a sectional view on the line 3—3 of Fig. 1.

Referring to the drawing by characters of reference there is shown the impulse generator of a gun control assembly including a casing 5 or mounting a shaft 6 which receives its energy from the aircraft engine and rotates at a speed to give an impulse for each blade of the propeller. A sleeve 7 mounted on a reduced part of the shaft 6 is connected thereto in any suitable manner preferably by means of a split wedge nut 8 threaded on the outer end of the shaft.

The sleeve 7 is provided with spaced clutch members, each having a single claw, the inner clutch member 9 being integral with the sleeve and the outer clutch member 10 being fastened to the sleeve by a key 11 and retained in place by a nut 12. The claws 13 and 14 of the respective clutch members 9 and 10 are angularly displaced a predetermined amount so that they may be employed under different conditions of propeller speed. For example, in the illustration, the displacement is sixty degrees, the clutch member 9 being arranged for synchronization when the propeller speed is between idling and 1500 R. P. M., and the clutch member 10 being advanced 60 degrees (in a clockwise direction looking upwardly from the bottom) with respect to the clutch member 9 and arranged for synchronization over a speed range from 1500 to 3000 R. P. M. With respect to a particular propeller blade, the zero shot for the high range of speeds is timed ahead of the blade and the zero shot for the low range of speeds is timed behind the blade.

A clutch member 15 constituting a driven shaft slidably mounted on the sleeve 7 is provided on its opposite ends with aligned single claws 16 and 17 adapted to be respectively engaged by the angularly displaced claws 13 and 14. The sliding clutch member 15 is formed with an annular groove 18 for receiving the fork 19 of a shifting member 20 which extends through an opening 21 in the casing 5. A pair of springs 22—22 seated on the casing 5 and acting on opposite ends of the shifting member normally maintain the latter in neutral position. The displacement of the shifting member to move the sliding clutch 15 into engagement with the clutch members 9 and 10 of the driving sleeve 7 may be accomplished either mechanically or electrically as indicated in Patent No. 1,750,706 of March 18, 1930, and governed according to the two sets of speed ranges.

The sliding or driven clutch member 15 is formed with a cam 23 adapted to engage a roller 24 carried by a cam follower 25 mounted in the casing 5. A lever 26 engaging the follower is connected by a cable 27 with a trigger motor (not shown) which is associated with the gun. The trigger motor acts on the cable in a well known manner to normally hold the follower in the path of movement of the cam 23. The cam serves to move the follower and thereby actuate the cable 27 and the trigger motor.

I claim.

1. Means for changing the phase relation of a driving and a driven shaft including a driving shaft, a sleeve fixed on said shaft, spaced clutch members on the sleeve each having a claw, the claw of one member angularly displaced with respect to the claw of the other member, a driven shaft slidably and rotatably mounted on the sleeve between the spaced clutch members and having a claw on each end, means for shifting the driven shaft.

2. Means for changing the phase relation of a driving and a driven shaft including a driving shaft having longitudinally spaced and angularly displaced driving surfaces, a driven shaft slidably and rotatably mounted on the driving shaft between the driving surfaces and having surfaces on its opposite ends for engagement with the driving surfaces, means for shifting the driven shaft into selective engagement with the driving surfaces and means for normally maintaining the driven shaft in a neutral position.

3. Means for changing the phase relation of a driving and a driven shaft including a driving shaft having longitudinally spaced and angularly displaced driving surfaces, a driven shaft slidably and rotatably mounted on the driving shaft between the driving surfaces and having surfaces on its opposite ends for engagement with the driving surfaces, and means for shifting the driven shaft into selective engagement with the driving surfaces.

JAMES L. HATCHER.